United States Patent
Kojima

(10) Patent No.: US 9,087,551 B2
(45) Date of Patent: Jul. 21, 2015

(54) DISK STORAGE APPARATUS AND WRITE METHOD

(75) Inventor: Shuichi Kojima, Kodaira (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 236 days.

(21) Appl. No.: 13/599,848

(22) Filed: Aug. 30, 2012

(65) Prior Publication Data

US 2013/0318295 A1    Nov. 28, 2013

(30) Foreign Application Priority Data

May 23, 2012    (JP) .................................. 2012-117347

(51) Int. Cl.
| G11B 27/11 | (2006.01) |
| G06F 12/00 | (2006.01) |
| G11B 20/10 | (2006.01) |

(52) U.S. Cl.
CPC ................................ *G11B 20/10009* (2013.01)

(58) Field of Classification Search
None
See application file for complete search history.

(56) References Cited

U.S. PATENT DOCUMENTS

| 8,411,386 | B2 * | 4/2013 | Hongawa et al. ............... 360/55 |
| 8,531,793 | B2 * | 9/2013 | Bandic et al. ................... 360/54 |
| 8,879,181 | B2 * | 11/2014 | Toda et al. ...................... 360/31 |
| 2009/0244775 | A1 | 10/2009 | Ehrlich | |
| 2011/0304939 | A1 | 12/2011 | Hirata et al. | |
| 2013/0031406 | A1 * | 1/2013 | Cho ............................. 714/6.1 |

FOREIGN PATENT DOCUMENTS

| JP | 2008-146753 A | 6/2008 |
| JP | 2009-245577 A | 10/2009 |
| JP | 2010-044820 A | 2/2010 |
| JP | 2010-152988 A | 7/2010 |
| JP | 2010-182406 A | 8/2010 |
| JP | 2012-003831 A | 1/2012 |

\* cited by examiner

*Primary Examiner* — K. Wong
(74) *Attorney, Agent, or Firm* — Knobbe Martens Olson & Bear LLP

(57) ABSTRACT

According to one embodiment, a disk storage apparatus includes a write controller and a refresh controller. The write controller is configured to perform shingled write, writing data on a disk, using, as write units, data areas including groups of tracks. The refresh controller is configured to count the number of times the shingled write has been performed in a data area adjacent to the inner or outer circumference of a data area, in accordance with a weighting value set on the basis of a shingled write direction, and to instructs that a refresh process be performed, when the number of times counted exceeds a threshold value.

15 Claims, 7 Drawing Sheets

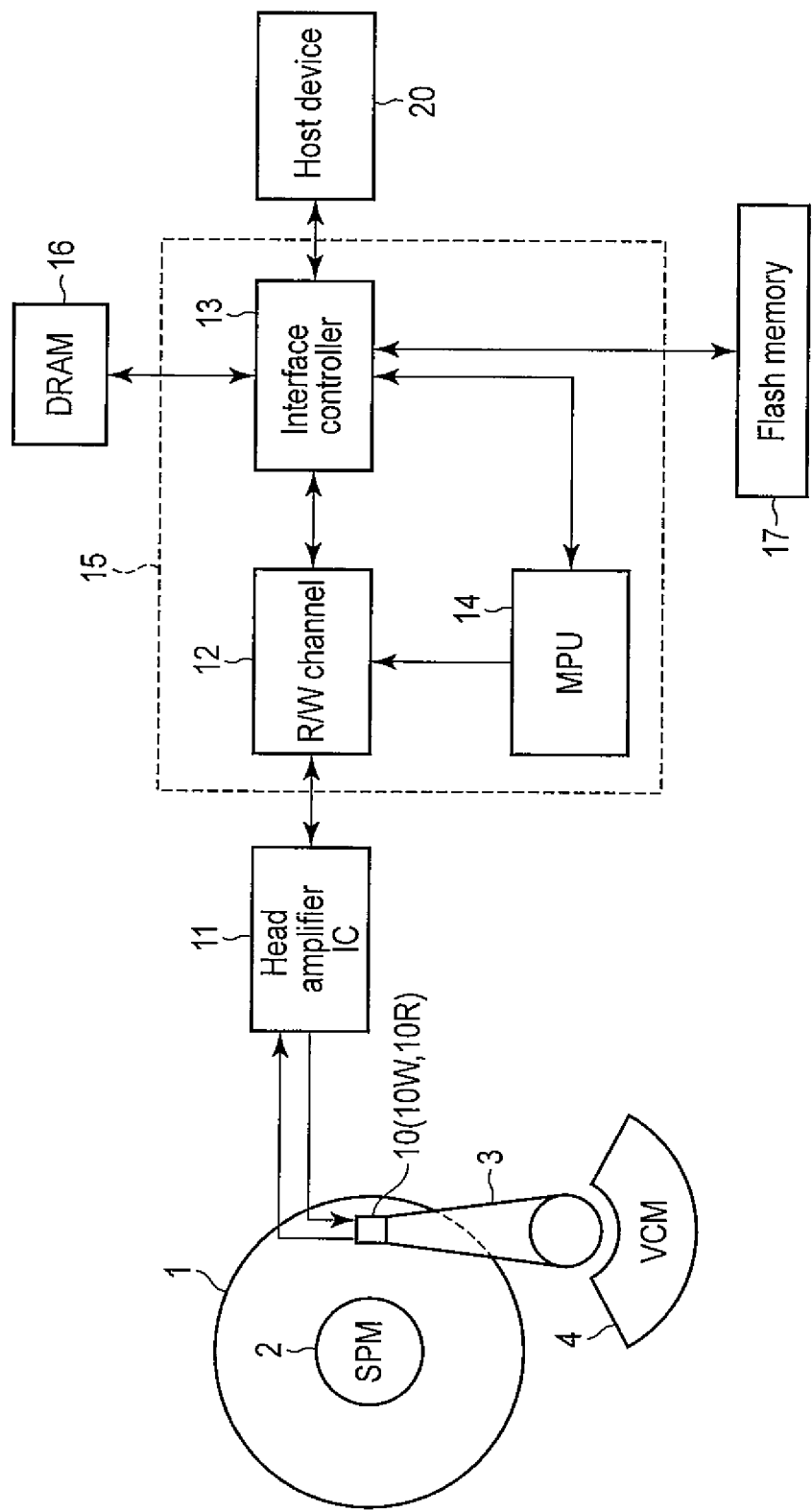
F I G. 1

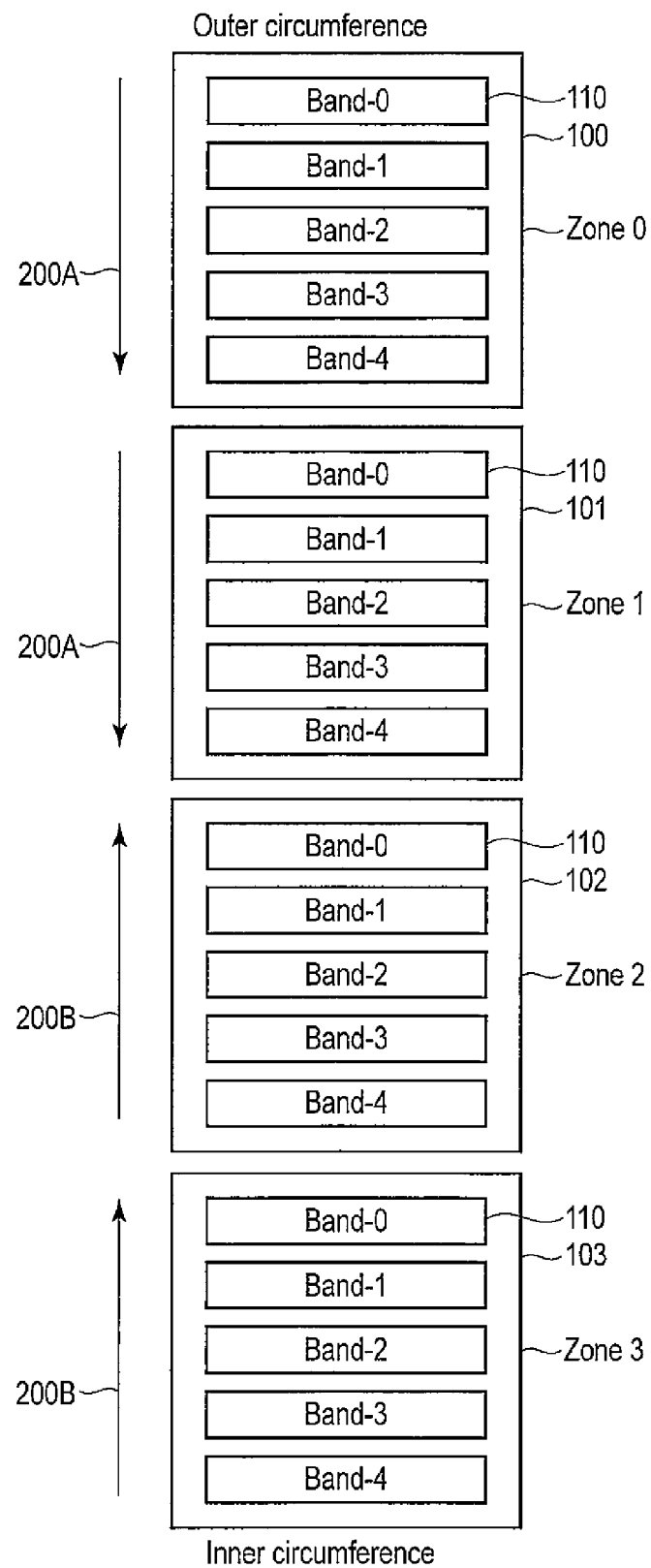
F I G. 2

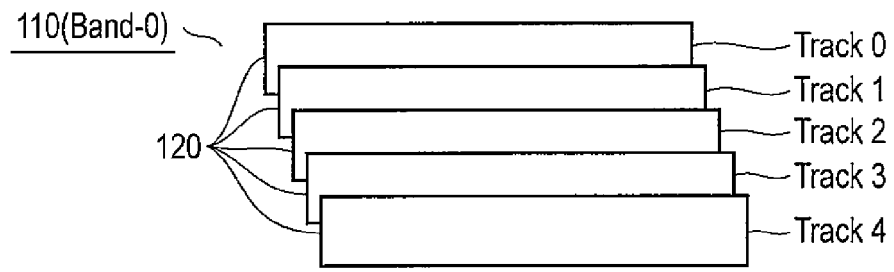
F I G. 3
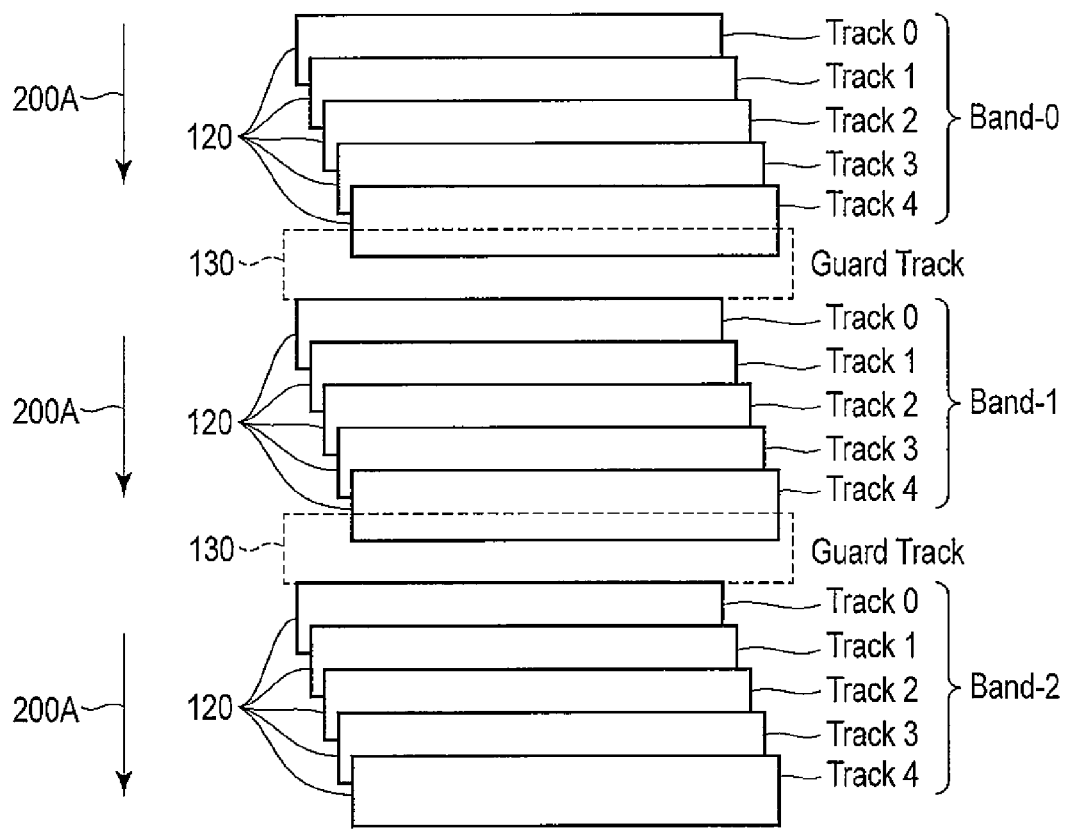
F I G. 4

| Band No. | Outer-circumference write counter | Inner-circumference write counter |
|---|---|---|
| | | |
| | | |
| | | |

| Zone | Weight value for outer circumference write counter | Weight value for inner circumference write counter |
|---|---|---|
| | | |
| | | |
| | | |

FIG. 7

| Zone | Weight value for outer circumference write counter | Weight value for inner circumference write counter | Direction of shingled write |
|---|---|---|---|
| 0 | 100 | 1 | Outer→Inner |
| 1 | 80 | 1 | Outer→Inner |
| 2 | 1 | 80 | Inner→Outer |
| 3 | 1 | 100 | Inner→Outer |

FIG. 8

| Zone | Weight value for outer circumference write counter | Weight value for inner circumference write counter | Direction of shingled write |
|---|---|---|---|
| 0 | 20 | 10 | Outer→Inner |
| 1 | 20 | 10 | Outer→Inner |
| 2 | 10 | 20 | Inner→Outer |
| 3 | 10 | 20 | Inner→Outer |

FIG. 9

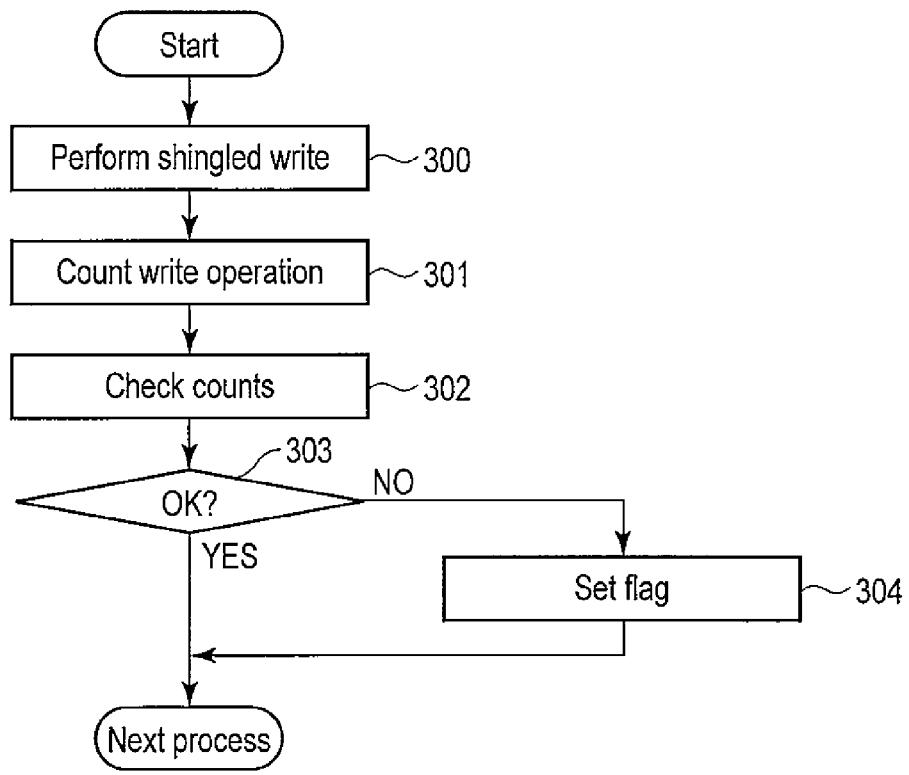
F I G. 10
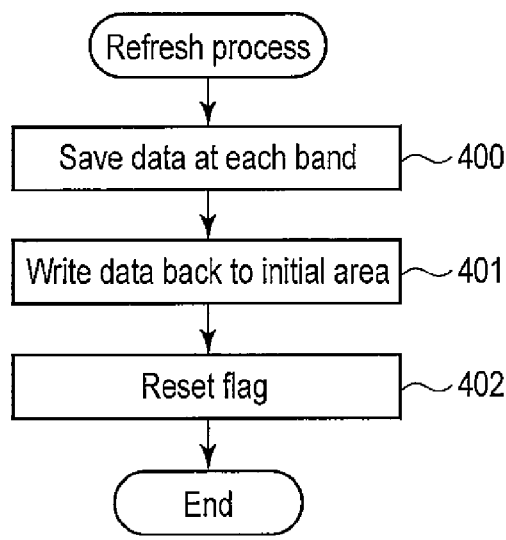
F I G. 11

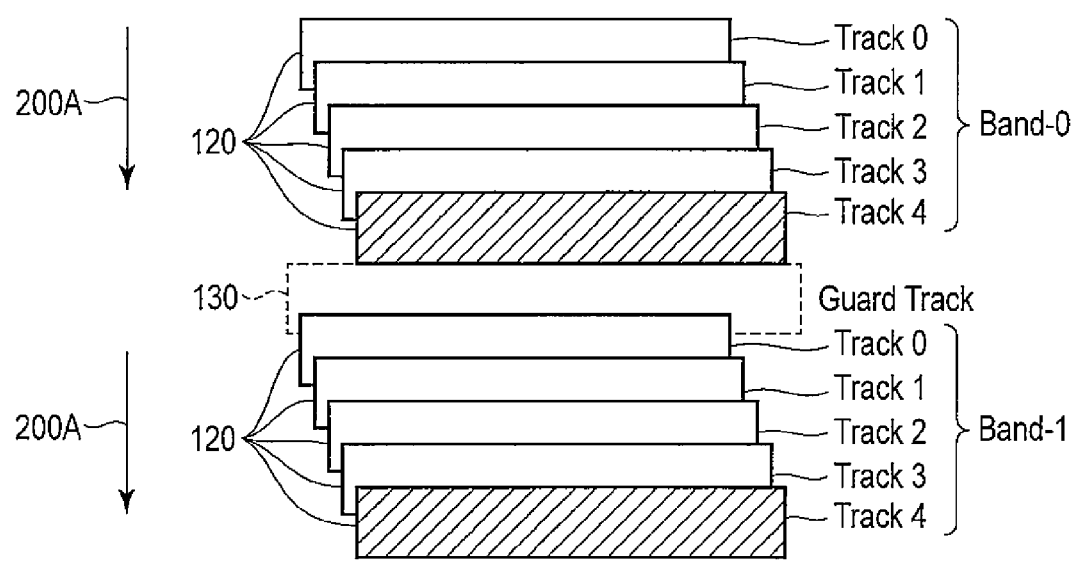
F I G. 12

DISK STORAGE APPARATUS AND WRITE METHOD

CROSS-REFERENCE TO RELATED APPLICATIONS

This application is based upon and claims the benefit of priority from Japanese Patent Application No. 2012-117347, filed May 23, 2012, the entire contents of which are incorporated herein by reference.

FIELD

Embodiments described herein relate generally to a disk storage apparatus using a shingled write, and a write method.

BACKGROUND

In recent years, the data writing method known as so-called "shingled write" has been developed as a technique achieving a high storage capacity, in disk storage apparatuses a representative example of which is the hard disk drive (HDD).

The shingled write method is a data writing method, in which data is written on one track and partly on the immediately adjacent track, in the radial direction of the disk. In the shingled write method, track group (band) composed of a plurality of tracks is defined as write unit. That is, data is rewritten in units of bands, in the shingled write method.

In any HDD, the magnetic recording intensity at each track may decrease because of the leakage of magnetic field from the adjacent tracks. This decrease in the magnetic recording intensity is called adjacent track interference (ATI). In the shingled write method, if data is written in a band, the magnetic recording intensity decreases at an outer or inner track of a track group adjacent to the band in which the data is written. To prevent the magnetic recording intensity from decreasing in the HDD using the shingled write method, a refresh process, rewriting the same data at the band, is performed.

In the HDD using the shingled write method, the number of times data has been written at the band adjacent to a specific band is counted, and the refresh process is performed when the count exceeds a threshold value. In the refresh process, the data is read from a band, temporarily saved in a memory and then written back to the band. This lowers the operating efficiency of the HDD. It is desired that the frequency of the refresh process should be minimized.

BRIEF DESCRIPTION OF THE DRAWINGS

FIG. 1 is a block diagram for showing the configuration of a disk drive according to one embodiment;

FIG. 2 is a diagram for explaining the configuration of bands according to the embodiment;

FIG. 3 is a diagram for explaining a shingled write method according to the embodiment;

FIG. 4 is a diagram for explaining the magnetic recording intensity at each band according to the embodiment;

FIG. 7 is a diagram for explaining a weight-defining table of count values, according to the embodiment;

FIG. 8 is a diagram for explaining an example of a weight-defining of count values, according to the embodiment;

FIG. 9 is a diagram for explaining an example of the weight-defining of count values, according to a modification of the embodiment;

FIG. 10 is a flowchart for explaining a refresh control according to the embodiment;

FIG. 11 is a flowchart for explaining another refresh control according to the embodiment; and FIG. 12 is a diagram for explaining how to optimize a refresh control in a modification of the embodiment.

DETAILED DESCRIPTION

Figures 5, 6:
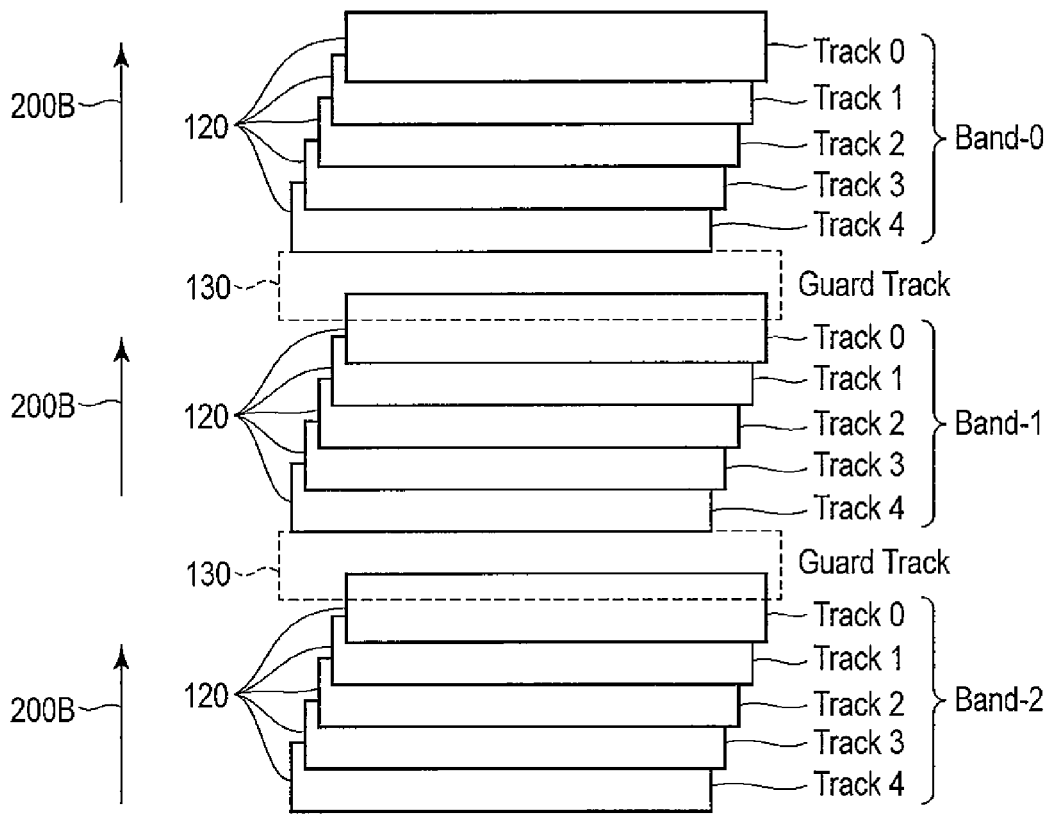
FIG. 5 is a diagram for explaining different magnetic recording intensity at each band according to the embodiment.
FIG. 6 is a diagram for explaining the configuration of a count table according to the embodiment.

In general, according to one embodiment, a disk storage apparatus includes a write controller and a refresh controller. The write controller is configured to perform shingled write, writing data on a disk, using, as write units, data areas comprising groups of tracks. The refresh controller is configured to count the number of times the shingled write has been performed in a data area adjacent to the inner or outer circumference of a data area, in accordance with a weighting value set on the basis of a shingled write direction, and to instructs that a refresh process be performed, when the number of times counted exceeds a threshold value.

Various embodiments will be described hereinafter with reference to the accompanying drawings.

[Configuration of the Disk Drive]

FIG. 1 is a block diagram showing the major components of a disk drive according to one embodiment.

As shown in FIG. 1, the disk drive comprises three units: a head-disk assembly (HAD), a head-amplifier integrated circuit (head-amplifier IC) 11, and a hard disk controller (HDC) 15.

The HAD has a disk 1, a spindle motor (SPM) 2, an arm 3, and a voice coil motor (VCM) 4. The disk 1 is a recording medium. The arm 3 holds a head 10. The spindle motor 2 rotates the disk 1. The arm 3 and the VCM 4 constitute an actuator. The actuator may be driven to move the arm 3, thereby to move the head 10 to a designated position above the disk 1.

The head 10 comprises a slider constituting a main body, and a write head 10W and a read head 10R, both mounted on the slider. The read head 10R is configured to read data recorded in any data track provided on the disk 1. The write head 10W is configured to write data to the disk 1.

The head amplifier IC 11 has a read amplifier and a write amplifier. The read amplifier amplifies a read signal read by the read head 10R and transmits the read signal to a read/write (R/W) channel 12. The write amplifier transmits a write current based on the write data output from the R/W channel 12, to the write head 10W.

The HDC 15 is a one-chip integrated circuit comprising the R/W channel 12, an interface controller 13, and a microprocessor (MPU) 14. The R/W channel 12 includes a read channel and a write channel. The read channel processes read data. The write channel processes write data.

The interface controller 13 controls the data transfer between a host device (hereinafter referred to as the host in some cases) and the R/W channel 12. The interface controller 13 controls a buffer memory (DRAM) 16, causing the same to store read data, and writes data temporarily, thereby controlling the supply of data. Further, the interface controller 13 controls a flash memory 17, storing various control data, such as a count table (later described), in the flash memory 17, and reading the control data from the flash memory 17.

The MPU 14 is the main controller in the drive. It performs a servo control, controlling the VCM 4 and thereby positions the head 10. The MPU 14 further performs refresh control including a process of counting the number of times the data is written, as will be described later.

[Refresh Control]

How the disk drive according to this embodiment operates, using the shingled write method also according to the embodiment, will explained with reference to FIG. 2 to FIG. 11.

FIG. 2 shows the configuration of the bands recorded on the disk 1 in the shingled write method. In the embodiment, the recording region of the disk 1 is divided into four zones (Zone 0 to Zone 3) 100 to 103, for convenience, and five bands (Band 0 to Band 4) 110 are arranged in each of zones 100 to 103. As shown in FIG. 3, each band 110 is composed of a group of tracks (i.e., 5 tracks 0 to 4, for convenience), and is defined as unit of shingled write.

The recording areas actually provided on the disk 1 are not only the data area for user data, but also the system data area for storing system data and the media cache area. In each of zones 100 to 103, the direction is set, in which each band 110 undergoes the shingled write. As shown In FIG. 2, the shingled write proceeds in each of zones 100 to 103, in direction 200A, or from the inner circumference toward the outer circumference of the disk 1. In zones 102 and 103, the shingled write proceeds in direction 200B. The direction of the shingled write should better be set to an optimal direction for each zone, in consideration of the influence of the magnetic field leaking to either adjacent track because of the azimuth deviation of the head 10. Note that the shingled write may proceed in the same direction in all zones 100 to 103.

As shown in FIG. 3, each band 110 is written in the shingled write method, from the tracks 120, i.e., track 0 to track 4, which overlap one another. In this embodiment, the shingled write proceeds, for example, from the outer circumference toward inner circumference of the disk 1.

FIG. 4 is a diagram explaining the magnetic recording intensity (signal intensity) observed at each band according if the shingled write is performed in direction 200A, from the outer circumference toward the inner circumference of the disk 1. The bands (i.e., Band 0 to Band 2 in this instance) are written, one overlapping the next, at track 0, track 1, track 2, track 3, track 4 in the order mentioned. A guard track 130 is provided between each and the next band. The guard band 130 is a region where no data (magnetic signal) is written.

In each band, the widths of tracks 0 to 4 indicate magnetic recording intensities, respectively. In this case, tracks 0 to 4 are written in the order mentioned. Therefore, one lateral edge of track 0 is influenced by the magnetic recording at track 1, and has its magnetic recording intensity reduced. Track 4, which is the last track of the band, is written last in the shingled write. Since track 4 is adjacent to a guard track 130, it is not influenced by the guard track 130 in terms of magnetic recording. Therefore, track 4 is less influenced than the other tracks 0 to 3 in terms of magnetic recording, and therefore remains magnetically intense.

FIG. 5 is a diagram explaining the magnetic recording intensity (signal intensity) observed at each band according if the shingled write is performed in direction 200B, from the inner circumference toward the outer circumference of the disk 1. In each of the bands (i.e., Band 0 to Band 2), track 4, track 3, track 2, track 1, track 0 are written in the order mentioned, from the inner circumference toward the outer circumference of the disk 1. Since track 4, track 3, track 2, track 1, track 0 are written in the order mentioned, one lateral edge of track 0 is influenced by the magnetic recording at track 3, and has its magnetic recording intensity reduced. Track 0, which is the last track of the band, is written last in the shingled write. Since track 0 is adjacent to a guard track 130, it is not influenced by the guard track 130 in terms of magnetic recording. Therefore, track 0 is less influenced than the other tracks 1 to 4 in terms of magnetic recording, and therefore remains magnetically intense.

How the shingled write and the refresh process are controlled in this embodiment will be explained with reference to the flowchart of FIG. 10 and the flowchart of FIG. 11.

In the disk drive, the controller 15 performs the shingled write in units of bands (Block 300). That is, the bands are sequentially written in direction 200A as shown in FIG. 4, from the outer circumference toward the inner circumference of the disk 1. Of each band, tracks 0, 1, 2, 3, 4 are therefore written in the order mentioned, each overlapping the next. Alternatively, the bands maybe sequentially written in direction 200B as shown in FIG. 5, from the inner circumference toward the outer circumference of the disk 1. In this case, tracks 4, 3, 2, 1, 0 of each band are written in the order mentioned, each overlapping the next.

In this embodiment, every time the controller 15 performs the shingled write on one band, it counts the write operation (Block 301). The flash memory 17 stores such a count table as shown in FIG. 6. As seen from FIG. 6, the count table functions as an outer-circumference write counter and an inner-circumference write counter, managing the number of times the bands (Band 0 to Band 4) have been sequentially written. For example, in a Band (Band 1), the outer-circumference write counter counts the number of times Band 0, i.e., the outermost band, has been written. The inner-circumference write counter counts the number of times Band 2, i.e., the innermost band, has been written. That is, the count table is a table that manages the adjacent track interference (ATI) each band receives from the adjacent band.

In the controller 15 of this embodiment, the MPU 14 refers to the count table, increasing the count of the outer-circumference write counter by one if the outer band (Band 0) adjacent to a band (for example, Band 1) is written, and increasing the count of the inner-circumference write counter by one if the inner band (Band 2) adjacent to the band (for example, Band 1) is written.

The flash memory 17 further stores such a weight-defining table of count values, as shown in FIG. 7. FIG. 8 is a diagram showing an example of the weight-defining table of count values.

As shown in FIG. 7, the weight-defining table is a table that defines the weights for the respective count values of the outer-circumference write counter and inner-circumference write counter for each of the zones (Zone 0 to Zone 3).

When the shingled write is performed and the counts of the outer-circumference write counter and inner-circumference write counter of the band (Band 1 for example) are increased, the MPU 14 refers to the weight-defining table of FIG. 7, increasing the weighting value, for the zone (Zone 0) of the band (Band 1). As a result, the counts of the outer-circumference write counter and inner-circumference write counter may take different value in accordance with the weighting value, even if the number of times the shingled write is performed are same.

Next, the MPU 14 refers to the count table and compares the counts of the outer-circumference write counter and the inner-circumference write counter with a prescribed common threshold value (Block 302). If either the count of the outer-circumference write counter or the count of the inner-circumference write counter exceeds the threshold value (if NO in Block 303), the MPU 16 sets a flag instructing the refresh process for the band (Band 1) in, for example, the flash memory 17 (Block 304). The threshold value is common to the counts of the outer- and inner-circumference write counters, and is equivalent to the tolerance value of the magnetic recording intensity. The count of the outer-circumference write counter and the count of the inner-circumference write counter may exceed the threshold value. In this case, the magnetic recording intensities at the tracks of the band are below the tolerance value.

On the other hand, neither the count of the outer-circumference write counter nor the count of the inner-circumference write counter may exceed the common threshold value. If this is the case (YES in Block 303), it is determined that the refresh process need not be performed on the band (Band 1). In other words, the magnetic recording intensities at tracks 0 to 4 of the band (Band 1) are determined to fall within the tolerant range.

The technical significance of the weight-defining table shown in FIG. 7 will be explained.

As has been described with reference to FIG. 4, if the shingled write proceeds in direction 200A, from the outer circumference toward the inner circumference, the last track 4 is less influenced than the other tracks 0 to 3 in terms of magnetic recording, and therefore remains magnetically intense, in each of the bands (Band 0 to Band 2). On the other hand, the track most influenced by the magnetic recording at the adjacent band is track 0, which is closer to the adjacent band than any other track.

As has been described with reference to FIG. 5, if the shingled write proceeds in direction 200B, from the inner circumference toward the outer circumference, the last track 0 is less influenced than the other tracks 1 to 4 in terms of magnetic recording, and therefore remains magnetically intense, in each of the bands (Band 0 to Band 2). On the other hand, the track most influenced by the magnetic recording at the adjacent band is track 4, which is closer to the adjacent band than any other track.

Thus, in the shingled write, the last track of each band remains more magnetically intense than any other tracks of the band, and the track of each band most close to the adjacent band is most influenced by the magnetic recording at the adjacent band. The track arranged nearest the adjacent band will more influenced by the magnetic recording at the adjacent band. Hence, the last track of any band can undergo the shingled write more times (larger write counts) than the first track of the band subjected to the shingled write.

In this embodiment, the weighting values for the count of the outer-circumference write counter and the count of the inner-circumference write counter in the weight-defining table of FIG. 7, are adjusted in accordance with the direction of the shingled write. This achieves an optimal refresh control.

FIG. 8 is a diagram explaining an example of the weight-defining table.

As shown in FIG. 2, the bands of zones 0 and 1 undergo the shingled write in direction 200A, from the outer circumference toward the inner circumference of the disk 1. In either zone, each band is much influenced by the write operation performed on the outer adjacent band. In zone 0, the weighting value of the inner-circumference write counter is set to 1 if the inner adjacent band undergoes the shingled write, and the weighting value of the outer-circumference write counter is set to 100 if the outer adjacent band undergoes the shingled write.

Also in zone 1, the weighting value of the outer-circumference write counter is set to a large value. However, different optimal weighting values are set to zones 0 and 1, respectively, because zones 0 and 1 assume different positions in the radial direction of the disk 1. The MPU 14 compares the counts of the outer-circumference write counter and the inner-circumference write counter with the prescribed common threshold value, with respect to each band. If either the count of the outer-circumference write counter or the count of the inner-circumference write counter exceeds the threshold value, the MPU 16 sets a flag instructing the refresh process.

By contrast, the bands of zones 2 and 3 undergo the shingled write in direction 200B, from the inner circumference toward the outer circumference of the disk 1. Therefore, a large weight value set to the count of the inner-circumference write counter, unlike for zones 0 and 1. Further, different optimal weighting values are set to zones 2 and 3, respectively, because zones 2 and 3 assume different positions in the radial direction of the disk 1.

As shown in FIG. 11, the controller 15 performs the refresh process in accordance with the flag instructing the refresh process. More precisely, the controller 15 performs the refresh process while the disk drive is idling, performing neither ordinary data-reading nor ordinary data-writing.

The controller 15 temporarily saves the data to be refreshed in the saving area of the disk 1, in units of bands (Block 400). Next, the controller 15 performs a rewriting process of writing the data from the saving area back to the initial recording area (Block 401). After performing the rewriting process, the controller 15 then resets the flag associated with the band thus refreshed (Block 402).

As described above, every time the shingled write is performed in units of bands, the number of times each band has been written is managed in this embodiment. If the band has been written more times than the threshold value, the refresh process is performed on the band. In this case, the outer-circumference write counter manages the number of times any band has been written at an outer circumference, and the inner-circumference write counter manages the number of times any ban has been written at an outer circumference. Further, different optimal weighting values are set to the counts of the outer-circumference write counter and inner-circumference write counter, respectively, in accordance with the direction of the shingled write. More specifically, the optimal weighting values are set, by using a weight-defining table showing the weighting values zone by zone associated with the counts the outer- and inner-circumference write counters may have.

The adjacent track interference (ATI) each band receives from the adjacent band can therefore be appropriately evaluated. Hence, if any two adjacent bands have been written the same number of times, the frequency of the refresh process on the band less influenced by the magnetic recording can be decreased. As a result, the frequency of the refresh process can be minimized. This can enhance the operating efficiency of the HDD.

In other words, in the shingled write method, two write-number counters are used, one for counting the number of times data has written at an outer circumference of the disk, and the other for counting the number of times data has written at an inner circumference of the disk. When data is written at a band adjacent to a certain band, the influence the leakage of magnetic field from the adjacent track imposes is evaluated from the weighting value applied to the band. From the influence so evaluated, the band that should be subjected to the refresh process is determined. An optimal refresh control can therefore be performed, in consideration of the influence from the outer or inner adjacent band in accordance with the direction in which the shingled write proceeds.

[Method of Optimizing the Refresh Control]

FIG. 9 and FIG. 12 are diagrams explaining a modification of the embodiment, respectively. Note that the HDD used in the modified embodiment is identical to the HDD shown in FIG. 1.

The modified embodiment is a method of optimizing the refresh control. As shown in FIG. 12, the last track 4 of each band is faintly influenced by the magnetic recording at the adjacent track 3 if the shingled write proceeds in direction 200A, from the outer circumference toward the inner circumference of the disk 1. If the shingled write proceeds in direction 200B, from the inner circumference toward the outer circumference of the disk 1, the last track 0 of each band is faintly influenced by the magnetic recording at the adjacent track 1. In the modified embodiment, the last track is written in an optimized condition different from the condition in which the any other track of the band, in order to reduce the influence the magnetic recording imposes on the adjacent band.

To be more specific, the write current is adjusted within the range the magnetic recording intensity (signal intensity) not too weak at the last track (i.e., track 4 or track 0), thereby writing data in the last track at a magnetic recording intensity lower than in any other track of the band. The modified embodiment further uses such a weight-defining table as shown in FIG. 6 and such a count table as shown in FIG. 9, thereby performing a refresh control (or ATI management) on each band.

If the first track (track 0 or track 4) that undergoes the shingled write receive excessive ATI from the shingled write performed on the adjacent band, the threshold value (common to the outer and inner circumferences of the disk) for activating the refresh process in units of bands must be set to a small value. If the threshold value is set so, the refresh process will be performed at high frequency, inevitably reducing the performance of the HDD.

Assume that the threshold value is set to 1000. Then, the weight-defining table of FIG. 8 instructs that a refresh process should be performed on any band in zone 0, which lies inner of a band that has been written ten times. Also assume that the condition at which to write the last track of the adjacent band has been adjusted, and such a weight-defining table as shown in FIG. 9 is thereby set. In this case, the outer-circumferential band adjacent to any band in zone 0 can be written up to 50 times.

Since the magnetic recording intensity (signal intensity) at the last track is relatively low, the influence (ATI influence) of the adjacent inner-circumferential band is relatively large. Therefore, only if the magnetic recording intensity and the influence (ATI influence) are traded off, the refresh control will be optimized to minimize the frequency of the refresh process.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk storage apparatus comprising:
   a disk; and
   a controller to perform a write process for writing data to the disk in a direction from an inner circumference to an outer circumference or a direction from the outer circumference to the inner circumference on the disk, in units of track groups each comprising a first track and a second track partially overlapping with the first track,
   wherein the controller
   counts a number of times of the write process executed to each of a second track group provided in the inner circumference of a first track group on the disk and a third track group provided in the outer circumference of the first track group in accordance with a weighting value set based on a direction of the write process of each of the first track and the second track in the first track group, and
   executes a rewrite process of data written to the first track group after either the counted number of times of the write process executed to the second track group or the counted number of times of the write process applied to the third track group exceeds a threshold value.

2. The disk storage apparatus of claim 1,
   wherein the controller is further configured to acquire, from a memory, table information which defines, according to a direction of the write process to the second and third track groups, the weighting value for the number of times of the write process of each of the second and third track groups based on an extent of influence of the magnetic recording from the second and third track groups, and to store, in the memory, each count value of counting the number of times of each write process in accordance with the weighting value which is set by referring to the table information.

3. The disk storage apparatus of claim 1,
   wherein the controller is further configured to set for each track group a flag for instructing that the rewrite process be performed, and to perform the rewrite process for the each track group based on the flag.

4. The disk storage apparatus of claim 1,
   wherein the controller is further configured to compare the threshold value, which is equivalent to a tolerant value of a magnetic recording intensity and is common to each of the second and third track groups, with the number of times of each write process.

5. The disk storage apparatus of claim 1,
   wherein the controller is further configured to set a write condition for the write process of a track written last in the first track group, in accordance with the direction of the write process to the second or third track groups, the write condition being different from that for other tracks in the band first track group.

6. A rewrite control method of a disk storage apparatus configured to perform a write process for writing data to the disk in a direction from an inner circumference to an outer circumference or a direction from the outer circumference to the inner circumference on the disk, in units of track groups each comprising a first track and a second track partially overlapping with the first track, the method comprising:
   counting a number of times of the write process executed to each of a second track group provided in the inner circumference of a first track group on the disk and a third track group provided in the outer circumference of the first track group in accordance with a weighting value set based on a direction of the write process of each of the first track and the second track in the first track group; and
   executing a rewrite process of data written to the first track group after either the counted number of times of the write process executed to the second track group or the counted number of times of the write process applied to the third track group exceeds a threshold value.

7. The method of claim 6, further comprising:
referring to table information which defines, according to a direction of the write process to the second and third track groups, the weighting value for the number of times of the write process of each of the second and third track groups based on an extent of influence of a magnetic recording from the second and third track groups; and counting the number of times of each write process in accordance with the weighting value which is set with reference to the table information.

8. The method of claim 6, further comprising comparing the threshold value, which is equivalent to a tolerant value of a magnetic recording intensity and is common to each of the second and third track groups, with the number of times of each write process.

9. The method of claim 6, further comprising:
setting for each track group a flag for instructing that the rewrite process be performed; and performing the rewrite process for the each track group based on the flag.

10. The method of claim 6, further comprising setting a write condition for the write process of a track written last in the first track group, in accordance with the direction of the write process to the second or third track groups, the write condition being different from that for other tracks in the first track group.

11. A disk storage apparatus comprising:
a disk; and
a controller to perform a write process for writing data to the disk in units of track group, each track group comprising a first track, a second track partially overlapping with the first track and a third track which has a width greater than the first track,
wherein the controller
performs a rewrite process of data written to a first track group on the disk after a number of times of the write process performed to a second track group provided near a first track of the first track group reached a first number, and performs the rewrite process of data written to the first track group after a number of times of the write process performed to a third track group provided near a third track of the first track group reached a second number greater than the first number.

12. The disk storage apparatus of claim 11,
wherein the controller is further configured to:
acquire, from a memory, table information which defines, according to a direction of the write process to the second and third track groups, the weighting value for the number of times of the write process of each of the second and third track groups based on an extent of influence of a magnetic recording from the second and third track groups; and store, in the memory, each count value of counting the number of times of each write process in accordance with the weighting value which is set by referring to the table information.

13. The disk storage apparatus of claim 11,
wherein the controller is further configured to:
set for each track group a flag for instructing that the rewrite process be performed; and perform the rewrite process for the each track group based on the flag.

14. The disk storage apparatus of claim 11,
wherein the controller is further configured to compare the threshold value, which is equivalent to a tolerant value of a magnetic recording intensity and is common to each of the second and third track groups, with the number of times of each write process.

15. The disk storage apparatus of claim 11, wherein the controller is further configured to set a write condition for the write process of a track written last in the first track group, in accordance with the direction of the write process to the second or third track groups, the write condition being different from that for other tracks in the first track group.

* * * * *